(12) United States Patent
Lifson

(10) Patent No.: US 7,831,483 B1
(45) Date of Patent: Nov. 9, 2010

(54) SYSTEM AND METHOD OF PROVIDING RECOMMENDATIONS

(75) Inventor: David M. Lifson, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 12/792,649

(22) Filed: Jun. 2, 2010

Related U.S. Application Data

(62) Division of application No. 11/854,490, filed on Sep. 12, 2007, now Pat. No. 7,756,756.

(51) Int. Cl.
*G06Q 30/00* (2006.01)
(52) U.S. Cl. ........................................................ 705/26
(58) Field of Classification Search ................ 705/26, 705/27
See application file for complete search history.

(56) References Cited

U.S. PATENT DOCUMENTS

| | | | |
|---|---|---|---|
| 6,901,379 B1 | 5/2005 | Balter et al. |
| 6,963,850 B1 | 11/2005 | Bezos et al. |
| 7,240,055 B2 | 7/2007 | Grasso et al. |
| 7,254,552 B2 | 8/2007 | Bezos et al. |
| 2001/0037255 A1 | 11/2001 | Tambay et al. |
| 2003/0093329 A1 | 5/2003 | Gutta |
| 2003/0093793 A1 | 5/2003 | Gutta |
| 2003/0167222 A1 | 9/2003 | Mehrotra et al. |
| 2003/0227479 A1 | 12/2003 | Mizrahi et al. |
| 2004/0230511 A1 | 11/2004 | Kannan et al. |
| 2005/0027612 A1 | 2/2005 | Walker et al. |
| 2005/0033656 A1 | 2/2005 | Wang et al. |
| 2005/0171955 A1 | 8/2005 | Hull et al. |
| 2005/0203807 A1 | 9/2005 | Bezos et al. |
| 2005/0256756 A1 | 11/2005 | Lam et al. |
| 2005/0273378 A1 | 12/2005 | MacDonald-Korth et al. |
| 2006/0085259 A1 | 4/2006 | Nicholas et al. |
| 2006/0200432 A1 | 9/2006 | Flinn et al. |
| 2006/0218153 A1 | 9/2006 | Voon et al. |
| 2006/0218225 A1 | 9/2006 | Hee Voon et al. |
| 2007/0179863 A1 | 8/2007 | Stoll |
| 2007/0239552 A1 | 10/2007 | Sundaresan |
| 2008/0162157 A1 | 7/2008 | Daniluk |

OTHER PUBLICATIONS

Author Unknown, "Internet technology and challenges of virtual communities," Jul. 2007, International Journal of Business Research, vol. 7, No. 4, p. 69.

*Primary Examiner*—Jeffrey A Smith
*Assistant Examiner*—Brandy Zukanovich
(74) *Attorney, Agent, or Firm*—Knobbe, Martens, Olson & Bear LLP

(57) ABSTRACT

A method of providing recommendations is disclosed and includes receiving input from a visitor of an online site. The input indicates a request to receive data related to an offering from an expert associated with the offering. In some embodiments, the method also includes sending a communication to the expert in response to the request. The communication requests data related to the offering.

19 Claims, 15 Drawing Sheets

Your friend Matthew asks:
"Will the Olympus SP550-UZ Camera be good for my trip to Iceland?"

- ☐ Yes
- ☐ No
- ✓ I don't wish to comment           1502
- ☐ I bought it and I'm happy with it
- ☐ I bought it and I'm not happy with it
- ☐ I purchased a similar product  [    ]
- ☐ I'm interested in the product
- ☐ I'm interested in a similar product  [    ]   1504
- ☐ I'm interested in this product category
- ☐ I'm interested in a related product  [    ]
- ☐ I purchased a related product  [    ]
- ☐ I've previously commented on this product
- ☐ Opt-Out
- ☐ I have an opinion on the product

SYSTEM AND METHOD OF PROVIDING RECOMMENDATIONS

REFERENCE TO RELATED APPLICATION

This application is a divisional of and claims benefit of priority to U.S. patent application Ser. No. 11/854,490, filed Sep. 12, 2007 and entitled "SYSTEM AND METHOD OF PROVIDING RECOMMENDATIONS," the entirety of which is incorporated herein by reference.

FIELD OF INVENTION

The present disclosure is generally related to providing recommendations related to offerings available via an online site.

BACKGROUND OF THE INVENTION

Products, services, subscriptions, and other offerings are available via online sites. Online sites can provide recommendations of similar or related products based on what other customers have purchased or viewed. Nonetheless, these generic recommendations may not be effective to persuade a visitor to the online site to make a purchase. For example, the use of generic recommendations can often produce lists of recommendations that are too long to be useful to the visitor. Hence, there is a need for an improved system and method of providing recommendations.

BRIEF DESCRIPTION OF THE DRAWINGS

FIG. 15 is a diagram of a sixth particular embodiment of a graphical user interface to provide recommendations.

DETAILED DESCRIPTION OF THE DRAWINGS

A system to provide recommendations is disclosed and includes a server system including processing logic and memory accessible to the processing logic. The memory includes instructions executable by the processing logic to provide an online site adapted to offer an electronic catalog for sale and to receive input from a visitor indicating a request to receive data related to an offering from a member of a social network associated with the visitor (e.g., an "ask-a-friend" request). The memory also includes instructions executable by the processing logic to send a communication to the member of the social network in response to the request, where the communication requests data related to the offering.

In another particular embodiment, a system to provide recommendations is disclosed and includes a server system including processing logic and memory accessible to the processing logic. The memory includes instructions executable by the processing logic to provide an online site adapted to offer a product for sale and to receive input from a visitor indicating a request to receive data related to the product from an expert associated with the product. The memory includes instructions executable by the processing logic to send a communication to the expert in response to the request, where the communication requests data related to the product.

In another particular embodiment, a method of providing recommendations is disclosed and includes receiving input from a visitor of an online site. The input indicates a request to receive data related to an offering from a member of a social network associated with the visitor. The offering is available for purchase via the online site. The method also includes sending a communication to the member of the social network in response to the request. The communication requests data related to the offering.

In another particular embodiment, a computer-readable medium is disclosed having processor-readable instructions that are executable by processing logic to perform a method, where the method includes receiving input from a visitor via an online site, the input indicating a request to receive data related to a product from a plurality of members of a social network associated with the visitor; and sending a communication to each of the plurality of members in response to the request. Each communication requests data related to the product.

Figure 1:
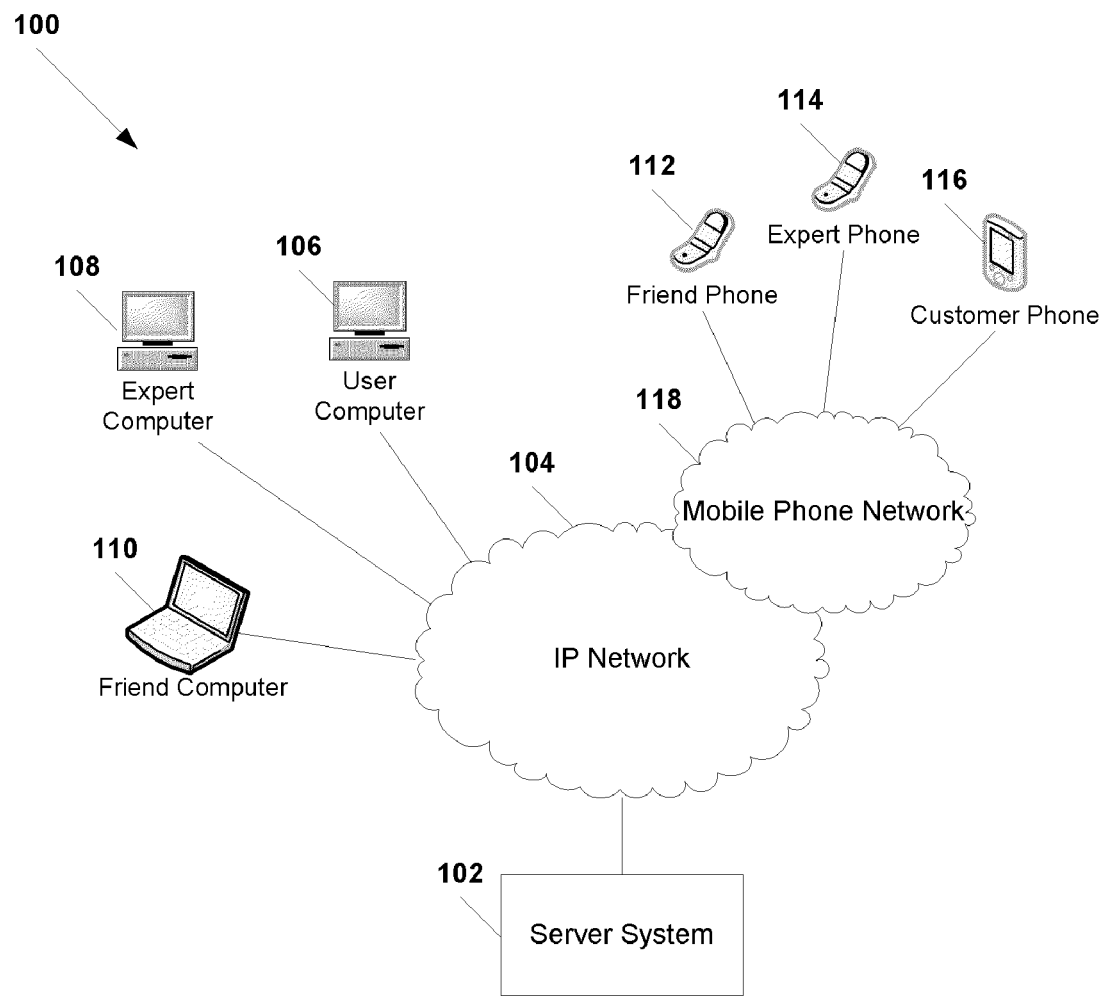
FIG. 1 is a general diagram of a particular embodiment of a system to provide recommendations.

Referring to FIG. 1, a particular embodiment of a system to provide recommendations is illustrated and designated generally 100. The system 100 includes a server system 102 that is adapted to provide an online site offering goods, services, subscriptions, or any combination thereof, via an Internet Protocol (IP) network 104, such as the Internet. The IP network 104 can be accessible to various computers, such as a visitor computer 106, an expert computer 108, a computing device of a member of visitor's social network, such as the friend computer 110, or any combination thereof. In an illustrative embodiment, the IP network 104 is accessible to one or more web-enabled mobile communication devices via the mobile phone network 118. For example, the IP network 104 can be accessible to a friend phone 112, an expert phone 114, a customer phone 116, or any combination thereof.

In a particular embodiment, the server system 102 is adapted to provide an online site via the IP network 104. The online site offers an electronic catalog of products, services, subscriptions, or any combination thereof, to customers or other visitors. A visitor can register with the online site and create one or more social networks, each of which can include one or more members. When the visitor registers with the online site, the online site can prompt the visitor for contact information associated with one or more members of a social network that is to be associated with the visitor. Such contact information can include names or other identifications, e-mail addresses, telephone numbers, mobile phone numbers, IP addresses, other contact information, or any combination thereof. The contact information can be received from the visitor computer 106, for example. In another embodiment, the server system is adapted to import the contact information from a contact list at the visitor computer 106, from an address book or other contact list at the visitor phone 116, from an online social networking site or other additional site provided by the IP network 104, or any combination thereof.

A visitor can select a product, service or other offering via the online site. The server system 102 is adapted to provide a detail page, such as a product-detail page, in response to the selection. The detail page includes a selectable indicator of an option to receive data related to the product from a member of a visitor's social network (e.g., an "ask-a-friend" indicator). Examples of such detail pages are illustrated in FIGS. 10-14. The server system 102 is adapted to receive a selection of an ask-a-friend or similar indicator from a visitor via the product detail page. In response to the selection of the indicator, the server system 102 is adapted to identify at least one social network associated with the visitor and retrieve contact information, communication preferences, other data, or any combination thereof, related to members the social network(s) of the visitor. The server system 102 is adapted to send a communication regarding the product or other offering to one or more members of the social network(s) of the visitor. In one embodiment, the member(s) can be selected by the visitor via a graphical user interface (GUI), such as the GUI illustrated in FIG. 11.

The server system 102 is adapted to send communications to one or more communications devices associated with the member(s) of the visitor's social network(s), such as the friend computer 110 and the friend phone 112. The communications can be sent via text message, e-mail message, instant messaging (IM) service, via interactive voice response (IVR) call, via other communication means, or any combination thereof. One or more of the communications can be sent according to communications preferences of one or more of the members.

The server system 102 is adapted to receive responsive data from the member(s) of the social network(s) to whom communications have been sent. Responsive data includes, for example, data indicating that the member does not wish to comment on the offering, data indicating that the member previously purchased the offering, data indicating that the member purchased a similar offering, data indicating that the member is interested in the offering, data indicating that the member is interested in a category of the offering, data indicating that the member is interested in a similar offering, data indicating that the member is interested in a related offering, data indicating that the member has previously purchased a related offering, data indicating that the member has previously commented on the offering, data indicating an opinion of the member about the offering, or any combination thereof.

The server system 102 is adapted to output the responsive data via the online site, for instance, via the detail page viewed by the visitor. In one embodiment, responsive data of one or more of the member(s) that is output to a visitor includes a rating pre-designated by the visitor. For example, a rating can indicate a level of trust associated with a member in general, with respect to a product category, with respect to other factors, or any combination thereof. The visitor can edit the ratings based on the responsive data. In another embodiment, the server system 102 is adapted to output behavioral data related to a member in addition to responsive data. Behavioral data includes, for examples, product purchases, product inquiries, product reviews, or any combination thereof.

The server system 102 is adapted to determine whether responsive data has been received from a member of a social network indicating that the member wishes not to receive future communications with respect to products, services, subscriptions, other offerings, or any combination thereof, which are viewed by the visitor of the online site. The server system 102 is adapted to remove the member from the social network associated with the visitor in response to an opt-out request.

In an illustrative, non-limiting embodiment, the server system 102 is adapted to send a polling message to each member of a social network of a customer or other visitor of the online site. For example, in response to a selection of an ask-a-friend indicator, the server system 102 can be adapted to send a communication to each member of a social network asking whether they have a favorable view of a product, service or subscription. The communication can indicate a polling period during which responses will be collected. The server system 102 is adapted to collect polling results and output the polling results to the visitor via the online site. The server system 102 is adapted to notify the visitor of an end of the polling period. The server system 102 can be adapted to output polling results to the visitor via e-mail, short messaging service (SMS), interactive voice response (IVR) system, instant messaging (IM) system, or other communication mode.

In a particular embodiment, the server system 102 is adapted to include with a detail page a selectable indicator of an option to receive data related to the product from an expert associated with the product (e.g., an "ask-an-expert" indicator). In response to a selection of the indicator, the server system is adapted to retrieve contact information, communications preferences, other data, or any combination thereof, corresponding to one or more experts associated with a product, service, subscription, or other offering being viewed by a visitor via the online site. The server system 102 is adapted to construct a communication and to send the communication to the expert(s). The server system 102 is adapted to send communications to the expert computer 108, the expert phone 114, or any combination thereof, according to communications preferences associated with each expert.

In one embodiment, server system 102 is adapted to receive a question from the visitor that is to be sent with a communication to the expert(s). The server system 102 is adapted to determine whether the expert has previously answered a similar question. If the question has been answered, the server system 102 is adapted to output the previous answer via the online site and not send the communication to the expert(s).

The server system 102 is also adapted to receive responsive data from an expert to whom a communication has been sent. Further, the server system 102 is adapted to output the responsive data via a detail page or other page of the online site. The server system 102 is adapted to receive ratings from a visitor with respect to the expert based at least partially on the responsive data. Ratings can be stored in association with expert data and can be output with future responsive data received from the expert and can be output to the visitor that designated the trust level or other rating.

Figure 2:
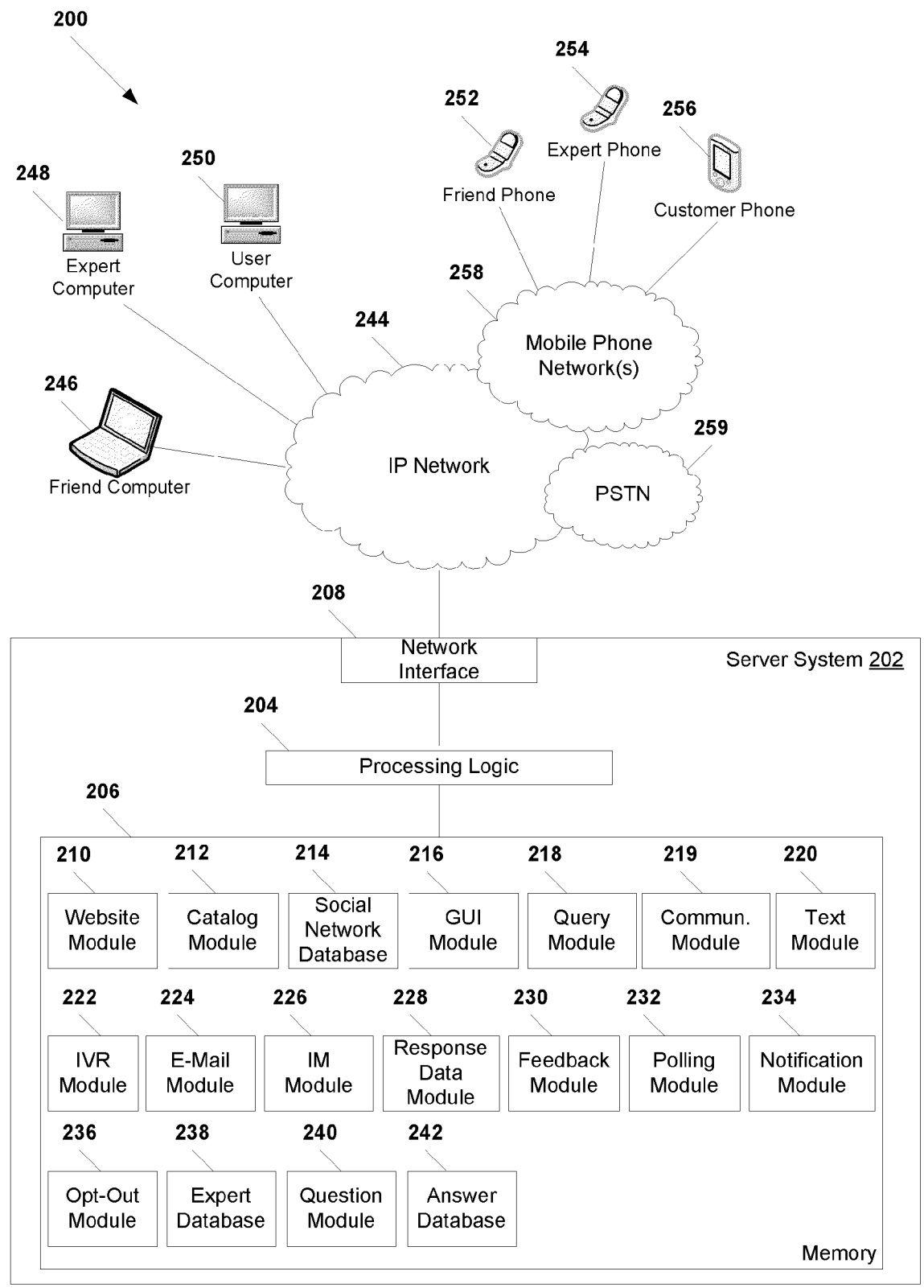
FIG. 2 is a general diagram of a second particular embodiment of a system to provide recommendations.

Referring to FIG. 2, a second particular embodiment of a system to provide recommendations is illustrated and designated generally 200. The system 200 includes a server system 202 that is adapted to provide an online site offering goods, services, subscriptions, other offerings, or any combination thereof, via an Internet Protocol (IP) network 244, such as the Internet. The IP network 244 can be accessible to various computers, such as a customer computer 250, an expert computer 248, a computing device of a member of a customer's social network, such as the friend computer 246, or any combination thereof. In an illustrative embodiment, the IP network 244 is accessible to one or more web-enabled mobile communication devices via one or more mobile phone networks 258. For example, the IP network 244 can be accessible to a friend phone 252, an expert phone 254, a customer phone 256, or any combination thereof. In another illustrative embodiment, the server system 202 communicates with a public switched telephone network (PSTN) 259 via the IP network 244.

In one embodiment, the server system 202 includes a single computer server, such as a web server. Alternatively, the server system 202 includes multiple servers that independently or redundantly include logic and memory adapted to provide one or more functions with respect to fulfilling electronic commerce-based transactions. The server system 202 includes processing logic 204, such as one or more processors, and memory 206 that is accessible to the processing logic 204, such as memory devices at one or more servers of the server system 202. The server system 202 also includes at least one network interface 208 to facilitate communication between the server system 202 and the IP network 244.

The memory 206 can include various modules 210-242 that are adapted to provide various functions of the server system 202 with respect to providing recommendations. The modules 210-242 can include processor-readable instructions that are executable by the processing logic 204, such as instructions included in one or more applications, operating systems, or other computer programs. In other embodiments, the modules 210-242 include any combination of instructions and hardware logic. The modules 210-242 can be distributed independently or redundantly among memory at one or more servers of the server system 202.

For example, the memory 206 includes a website module 210 that is executable by the processing logic 204 to provide an online site via the IP network 244. The online site 210 offers an electronic catalog of products, services, subscriptions, other offerings, or any combination thereof, to customers or other visitors. The memory 206 includes a catalog module 212 to store data related to the products, services, subscriptions, other offerings, or any combination thereof, that are offered via the online site. The website module 210 is executable by the processing logic 204 to provide a search process via the online site, which allows visitors to search the data stored by the catalog module 212 and which returns one or more search results in response to a search.

The memory includes a social network database 214 to store social network information associated with various customers or other visitors that are registered with the online site. For example, when a visitor registers with the online site, the website module 210 is executable by the processing logic 204 to prompt the visitor for contact information associated with one or more members of a social network that is to be associated with the visitor. Such contact information can include names or other identifications, e-mail addresses, telephone numbers, mobile phone numbers, IP addresses, other contact information, or any combination thereof. The website module 210 is executable by the processing logic 204 to receive contact information that is entered via the customer computer 250, for example. In another embodiment, the website module 210 is executable by the processing logic 204 to import the contact information from a contact list at the customer computer 250, from an address book or other contact list at the customer phone 256, from an online social networking site or other additional site provided by the IP network 244, or any combination thereof. The social network database 214 can store one or more social networks associated with a visitor. In an illustrative embodiment, members of social networks can overlap. The social network database 214 can also store communications preferences of one or more members of a visitor's social network.

Further, the memory 206 includes a graphical user interface (GUI) module 216 that is executable by the processing logic 204 to provide various graphical user interfaces including interactive graphical elements via the online site. For example, the GUI module 216 can be executable by the processing logic 204 to provide a detail page, such as a product-detail page, via the online site in response to a selection of a product from search results or another page of the online site. The GUI module 216 is executable by the processing logic 204 to include with the detail page a selectable indicator of an option to receive data related to the product from a member of a visitor's social network (e.g., an "ask-a-friend" indicator). Examples of such detail pages are illustrated in FIGS. 10-14.

Figure 11:
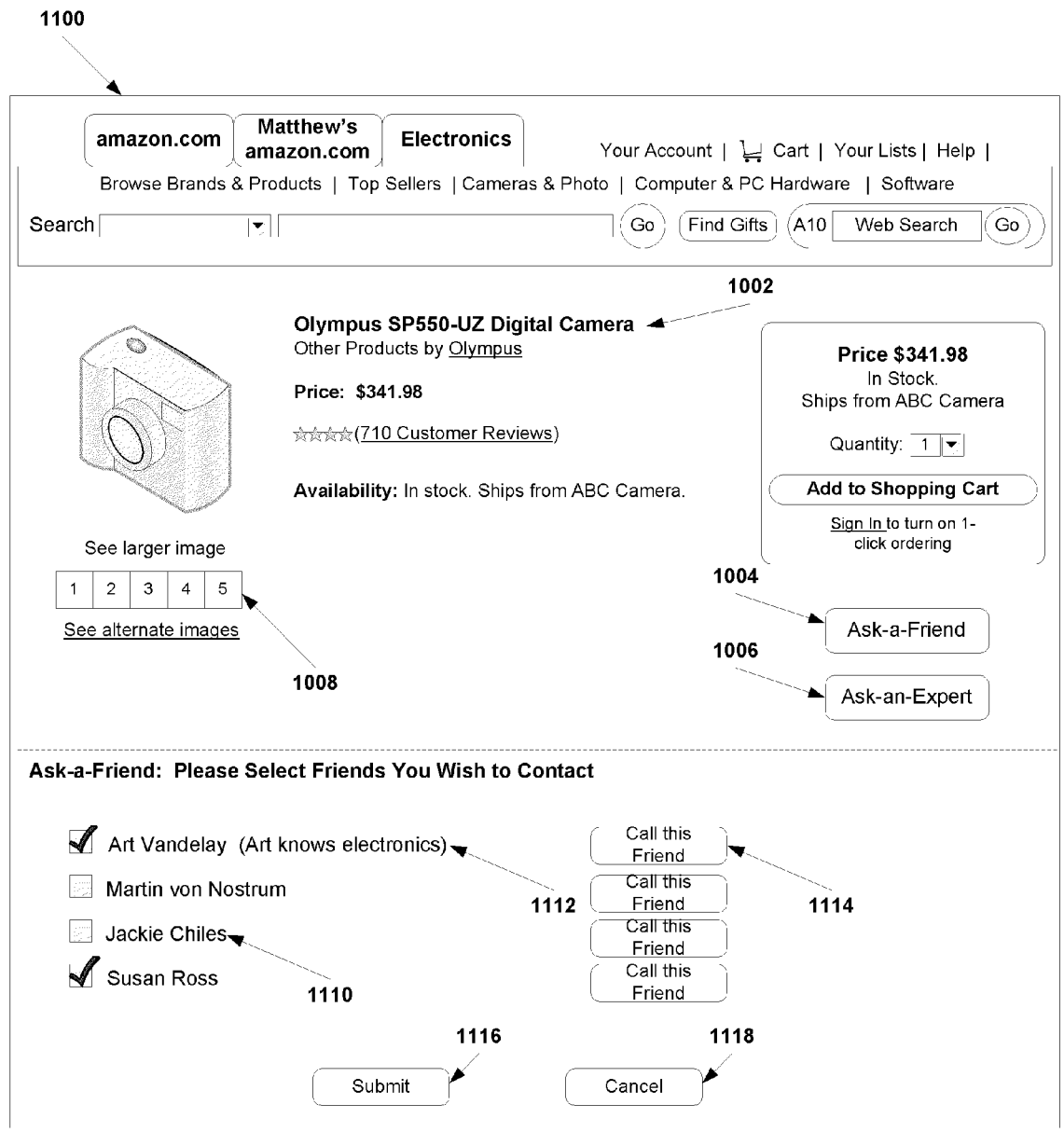
FIG. 11 is a diagram of a second particular embodiment of a graphical user interface to provide recommendations.

The GUI module 216 is executable by the processing logic 204 to receive a selection of an ask-a-friend or similar indicator from a visitor via the product detail page. The memory includes a query module 218 that is executable by the processing logic 204 to query the social network database 214 to retrieve contact information, communication preferences, other data, or any combination thereof, related to members of one or more social networks of the visitor. In one embodiment, the GUI module 216 is executable by the processing logic 204 to output a list of selectable members of one or more social networks associated with the visitor and to receive selections of one or more members to whom a communication regarding the product is to be sent. An example of such a GUI is illustrated in FIG. 11.

In a particular embodiment, the memory 206 includes a question module 240 that is executable by the processing logic 204 to prompt the visitor for a question to be submitted to the member(s) to whom a communication regarding the product is to be sent. The memory 206 includes an answer database 242 that stores answers received from such members. When a question is received from the visitor, the question module 240 is executable by the processing logic 204 to determine whether the answer database 242 stores an answer to the question from one or more of the members to whom a communication regarding the product is to be sent. Previously stored answers can be displayed via the product detail page.

The memory 206 includes a communication module 219 that is executable by the processing logic 204 to construct a communication regarding the product in response to a selection of the ask-a-friend indicator and to send the communication to one or more members of the social network(s) of the visitor, while observing communications preferences of one or more of the members. In an illustrative embodiment, the communication module 219 is executable by the processing logic 204 to construct a communication that includes selectable indicators or response options. In one embodiment, a question submitted by the visitor can be included in a communication. The communication module 219 or the question module 240 can be executable by the processing logic 204 to tag the communication, such that an answer to the question can be associated with the answering member and stored at the answer database for future use. An example of such a communication is illustrated in FIG. 15.

The memory 206 includes a text module 220 that is executable by the processing logic 204 to send communications to the friend phone 252, or other device of a member of a social network, via a short messaging service (SMS) or other text messaging service. Further, the memory 206 includes an interactive voice response (IVR) module 222 that is executable by the processing logic 204 to send interactive voice communications to the friend phone 252, or other device of a member of a social network. In addition, the memory 206 includes an e-mail module 224 that is executable by the processing logic 204 to send communications to the friend phone 252, friend computer 250, other device of a member of a social network, or any combination thereof, via electronic mail. Moreover, the memory 206 includes an instant messaging (IM) module 226 that is executable by the processing logic 204 to send communications to the friend phone 252, friend computer 250, other device of a member of a social network, or any combination thereof, via an IM service. In other embodiments, the server system 202 can be adapted to send communications to members of social networks via the public-switched telephone network 259.

The memory 206 includes a response data module 228 that is executable by the processing logic 204 to receive responsive data from a member of a social network to whom a communication has been sent. The GUI module 216 is executable by the processing logic 204 to output the responsive data via the detail page or other GUI of the online site. In a particular embodiment, the memory 206 includes a feedback module 230 that is executable by the processing logic 204 to receive ratings from a visitor associated with the social network that includes the members whose responsive data is output via the online site. For example, the ratings can indicate a level of trust associated with a member in general, with respect to a product category, with respect to other factors, or any combination thereof. In another example, the feedback module 230 is executable by the processing logic 204 to determine a rating associated with a member based on a plurality of inputs from the visitor over time, such as inputs indicating whether a member's response was helpful or not helpful. In one embodiment, the feedback module 230 is executable by the processing logic 204 to designate a member of a social network as an expert with respect to a category of offering after a pre-defined number of positive inputs by the visitor, by one or more other visitors, or a combination thereof, with respect to offerings within the category. Ratings can be stored in association with member data at the social network database 214 and can be output with future responsive data received from the member and can be output to the visitor that designated the trust level or other rating.

In an illustrative, non-limiting embodiment, the memory 206 includes a polling module 232 that is executable by the processing logic 204 to send a polling message to each member of a social network of a customer or other visitor of the online site. For example, in response to a selection of an ask-a-friend indicator, the polling module 232 is executable by the processing logic 204 to send a communication to each member of a social network asking whether they have a favorable view of a product, service, subscription or other offering. The communication can indicate a polling period during which responses will be collected. The polling module 232 is executable by the processing logic 204 to collect polling results and output the polling results to the visitor via the online site.

The memory 206 includes a notification module 234 that is executable by the processing logic 204 to notify the visitor of an end of a polling period. The notification module 234 can also be executable by the processing logic 204 to notify the members of the social network of the end of the polling period and that no further poll responses will be accepted. In addition, the notification module 234 can also be executable by the processing logic 204 to output polling results to the visitor via e-mail, SMS, IVR, IM or other communication mode.

The memory 206 includes an opt-out module 236 that is executable by the processing logic 204 to determine whether responsive data has been received from a member of a social network indicating that the member wishes not to receive future communications with respect to products, services, subscriptions, other offerings, or any combination thereof, which are viewed by the visitor of the online site. The opt-out module 236 is executable by the processing logic 204 to remove the member from the social network associated with the visitor at the social network database 214.

In a particular embodiment, the GUI module 216 is executable by the processing logic 204 to include with a detail page a selectable indicator of an option to receive data related to the product from an expert associated with the product (e.g., an "ask-an-expert" indicator). In response to a selection of the indicator, the query module 218 is executable by the processing logic 204 to query an expert database 238 to retrieve contact information, communications preferences, other data, or any combination thereof, corresponding to one or more experts associated with a product, service, subscription, or other offering being viewed by a visitor via the online site. In one example, an expert can be pre-designated, such as an expert associated with a vendor of an offering. In another example, the expert can be determined based on positive inputs from the visitor, from one or more other visitors, or a combination thereof. For instance, an individual may be associated with a social network of the visitor before being designated as an expert. The communication module 219 is executable by the processing logic 204 to construct a communication and to send the communication to the expert(s). The text module 220, the IVR module 222, the e-mail module 224, and the IM module 226, are executable by the processing logic 204 to send communications to the expert computer 248, the expert phone 254, or any combination thereof, according to communications preferences associated with each expert.

In one embodiment, the memory 206 includes a question module 240 that is executable by the processing logic 204 to receive a question from the visitor that is to be sent with a communication to the expert(s). The query module 218 is executable by the processing logic 204 to query an answer database 242 to determine whether the expert has previously answered a similar question. If the question has been answered, the GUI module 216 is executable by the processing logic to output the previous answer via the online site and not send the communication to the expert(s).

The response data module 228 is executable by the processing logic 204 to receive responsive data from an expert to whom a communication has been sent. The GUI module 216 is executable by the processing logic 204 to output the responsive data via the detail page or other GUI of the online site. The responsive data can be stored at the answer database 242. In a particular embodiment, the feedback module 230 is executable by the processing logic 204 to receive ratings from a visitor with respect to the expert based at least partially on the responsive data. Ratings can be stored in association with expert data at the expert database 238 and can be output with future responsive data received from the expert and can be output to the visitor that designated the trust level or other rating.

Figure 3:
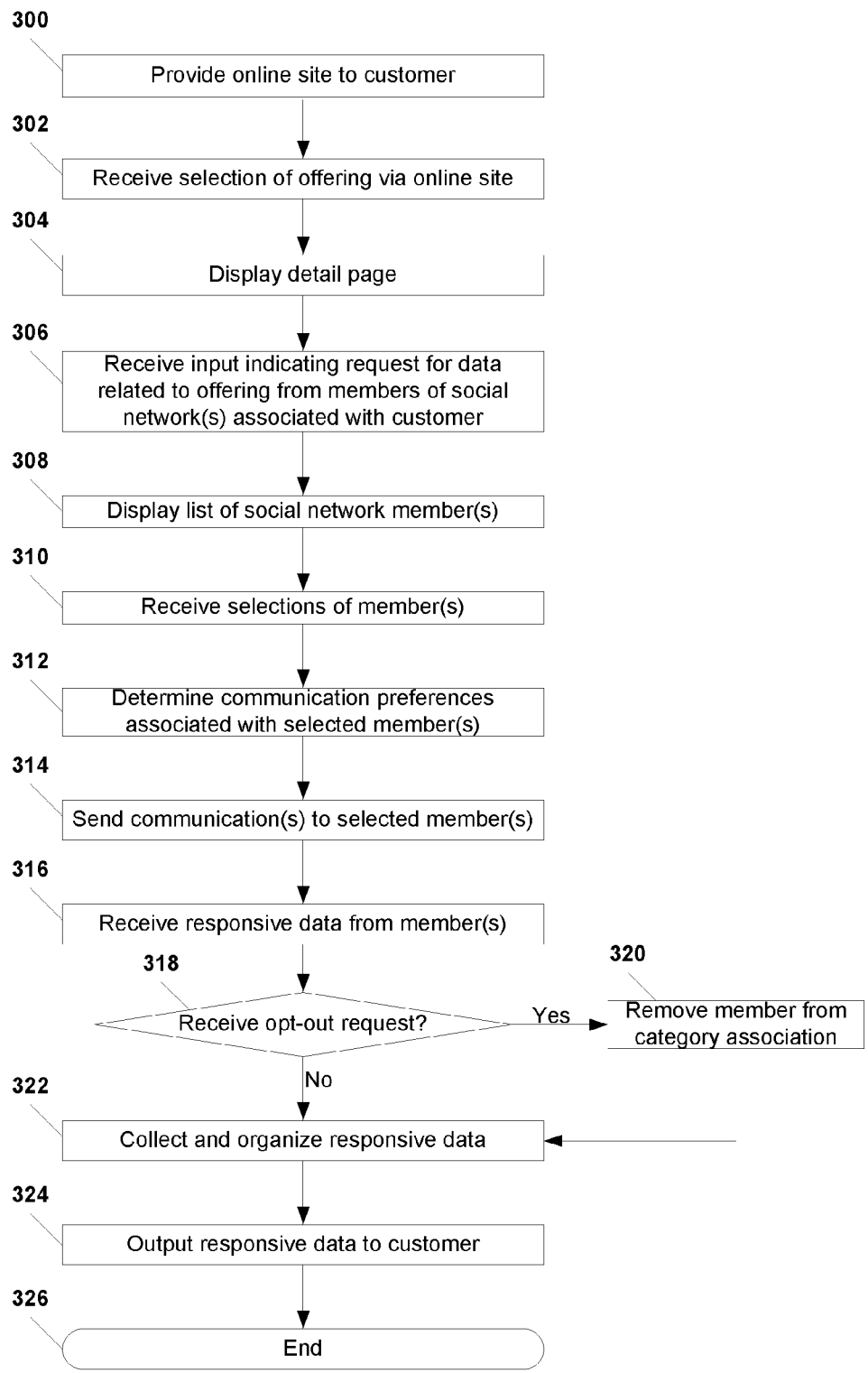
FIG. 3 is a flow diagram of a particular embodiment of a method of providing recommendations.

Referring to FIG. 3, a particular embodiment of a method of providing recommendations is illustrated. At block 300, a server system provides an online site to a visitor, such as a customer, via a computing device, mobile phone, or other device. The online site provides a catalog of goods, services, subscriptions, other offerings, or any combination thereof, for purchase. Moving to block 302, the server system receives a selection of an offering from the visitor via the online site. Proceeding to block 304, the server system displays a detail page related to the offering via the online site.

Continuing to block 306, the server system receives input indicating a request for data related to the offering from one or more members of a social network associated with the visitor. In one embodiment, the input includes a selection of an "ask-a-friend" indicator or a similar selectable indicator provided with the detail page. Advancing to block 308, a list, or other graphical presentation, identifying members of at least one social network is displayed via the online site. The identifications of the members are selectable. At block 310, the server system receives selections of one or more members from the list.

Moving to block 312, the server system determines communications preferences associated with one or more of the selected member(s). For instance, some members may prefer to be contacted via e-mail, some via text message, others via instant messaging, others by phone call, and still others may have no communications preferences. Proceeding to block 314, the server system sends a communication to each selected member, according to communications preferences associated with the selected member. An example embodiment of such a communication is illustrated in FIG. 15.

Continuing to block 316, the server system receives responsive data from one or more member to whom a communication was sent. Advancing to decision 318, the server system determines whether responsive data from any member includes an opt-out request. If the server system does not receive an opt-out request, the method moves to block 322. On the other hand, if the server system receives an opt-out request, the method moves to block 320, and the server system disassociates the member making the request from future communications regarding the category of the offering. The method then proceeds to block 322.

At block 322, the server system collects and organizes the responsive data. For example, the server system may organize responsive data according to which members have purchased the offering and which members have not purchased the offering. Continuing to block 324, the server system outputs the organized data to the visitor via the detail page or another graphical interface of the online site. The method terminates at 326.

Figure 4:
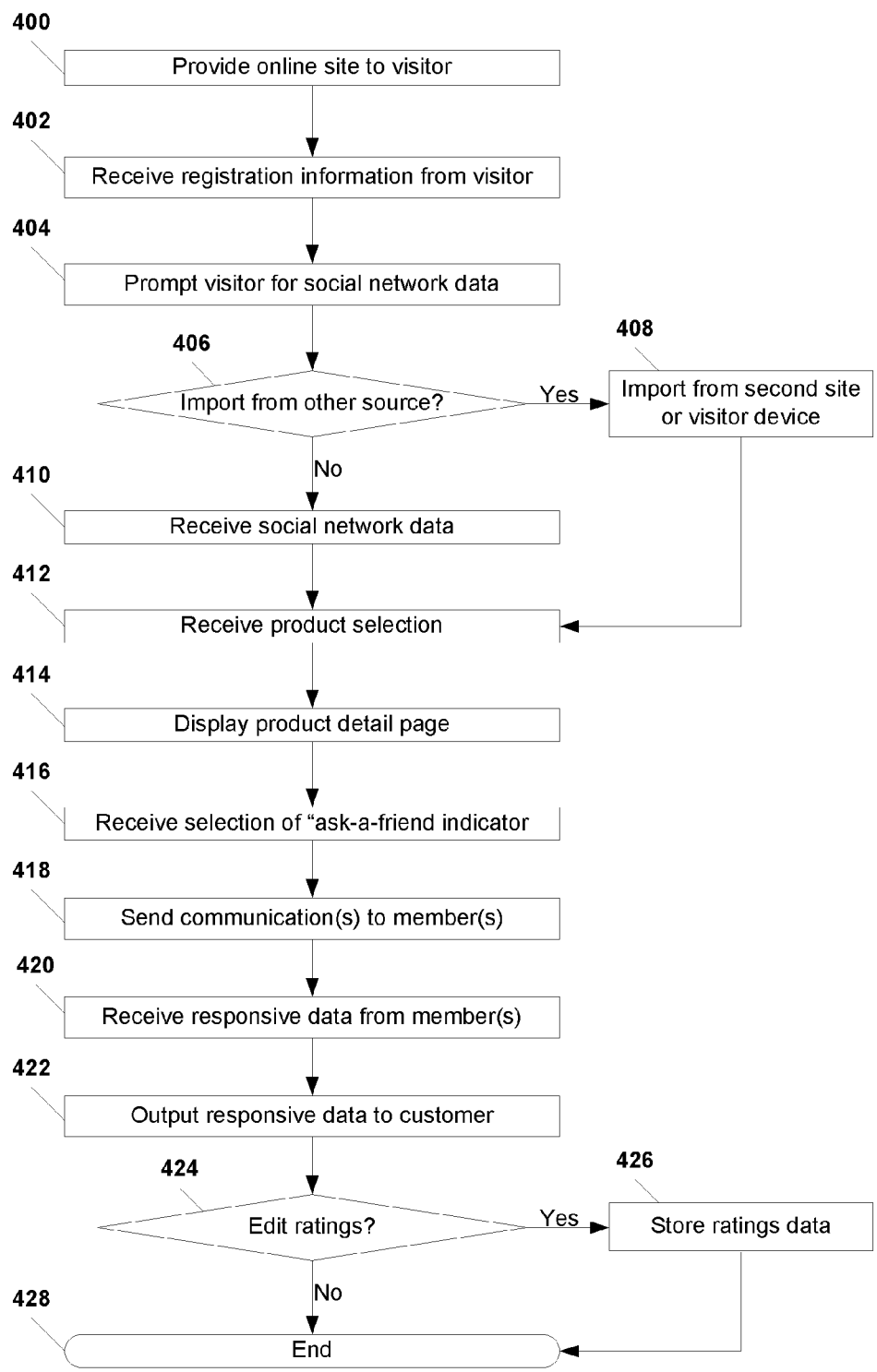
FIG. 4 is a flow diagram of a second particular embodiment of a method of providing recommendations.

Referring to FIG. 4, a second particular embodiment of a method of providing recommendations is illustrated. At block 400, a server system provides an online site to a visitor. The online site provides a catalog of goods, services, subscriptions, other offerings, or any combination thereof, for purchase. Moving to block 402, the server system receives registration information from the visitor. Proceeding to block 404, the server system prompts the visitor for data related to one or more social networks that are to be associated with the visitor. For instance, the server system prompts the visitor for contact information of one or more members that are to be associated with the social network(s).

Continuing to decision 406, the server system determines whether it has received a command to import social network data from another source, such as a computing device or mobile phone of the visitor, or from another online site, such as a social networking site. If the server system has received a command to import social network data from another source, the method advances to block 408, and the server system imports the social network data from another online site or a visitor device. The method then moves to block 412. Conversely, if the server system does not receive a command to import social network data from another source, the method advances to block 410, and the server system receives the social network from the visitor via a social network setup process provided via the online site. The method then moves to block 412.

Moving to block 412, the server system receives a selection of an offering, such as a product, from the visitor via the online site. Proceeding to block 414, the server system displays a product detail page via the online site. Continuing to block 416, the server system receives input indicating a selection of an "ask-a-friend" indicator or a similar selectable indicator provided with the product detail page. Advancing to block 418, the server system sends a communication to one or more members of a social network associated with the visitor. An example embodiment of such a communication is illustrated in FIG. 15.

Continuing to block 420, the server system receives responsive data from one or more members to whom a communication was sent. At block 422, the server system outputs the responsive data via the detail page or another graphical interface of the online site. Moving to decision 424, the server system determines whether it is to edit rating information associated with one or more members whose responsive data has been output via the product detail page. For instance, the server system can determine whether it has received a request from the visitor to designate ratings. Alternatively, the server system can determine whether it has received input from the visitor indicating whether responsive data from a particular member was helpful or not helpful, whereupon the server system can automatically adjust a rating associated with the particular member. If the server system determines that it is to edit rating information, the method proceeds to block 426, and the server system stores the re-designated or re-calculated rating information. The method terminates at 428.

Figure 5:
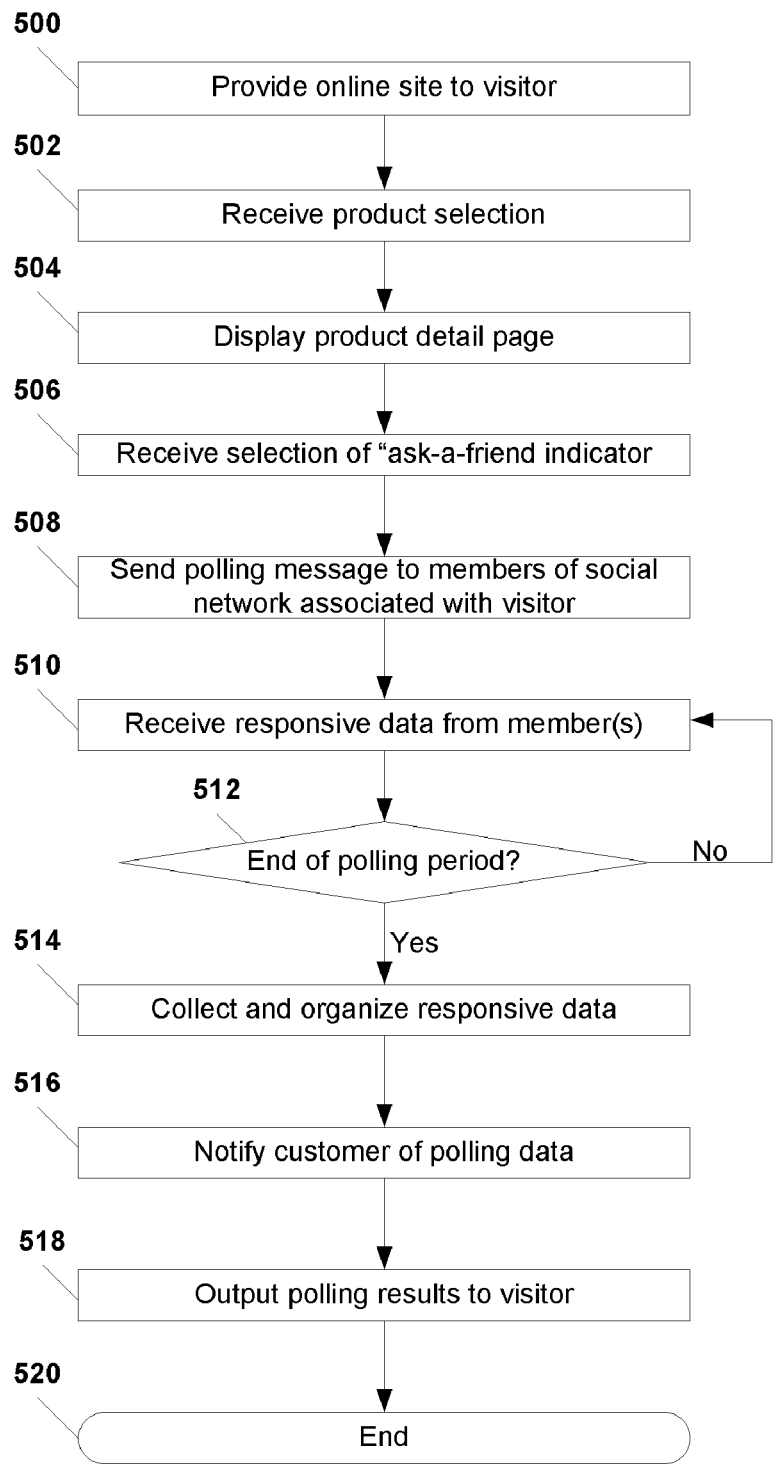
FIG. 5 is a flow diagram of a third particular embodiment of a method of providing recommendations.

Referring to FIG. 5, a third particular embodiment of a method of providing recommendations is illustrated. At block 500, a server system provides an online site to a visitor, such as a customer or a potential customer, via a computing device, mobile phone, or other device. The online site provides a catalog of goods, services, subscriptions, other offerings, or any combination thereof, for purchase. Moving to block 502, the server system receives a selection of an offering, such as a product, from the visitor via the online site. Proceeding to block 504, the server system displays a product detail page via the online site.

Continuing to block 506, the server system receives input indicating a request for data related to the offering from one or more members of a social network associated with the visitor. In one embodiment, the input includes a selection of an "ask-a-friend" indicator or a similar selectable indicator provided with the detail page. Advancing to block 508, the server system sends a polling message to members of at least one social network associated with the visitor. In one embodiment, the polling message asks each member whether he or she has a favorable or unfavorable view of the product. In another embodiment, the polling message asks each member whether he or she has or has not purchased the product.

Continuing to block 510, the server system receives responsive data from one or more member to whom a communication was sent. Advancing to decision 512, the server system determines whether a polling period has ended. When the polling period ends, the method moves to block 514, and the server system collects and organizes the responsive data. For example, the server system may organize responsive data according to which members have purchased the offering and which members have not purchased the offering. Continuing to block 516, the server system notifies the visitor that the polling data is ready to view. For instance, if the visitor has logged off the online site, the server system can send an e-mail or other notification to the visitor indicating that the polling period has ended or that polling results are complete. Proceeding to block 518, the server system outputs the polling results to the visitor. The polling results can be output via the online site if the visitor has waited for the results, or when the visitor logs back in. In other embodiments, the polling results can be output to the visitor with the notification sent at 516. The method terminates at 520.

Figure 6:
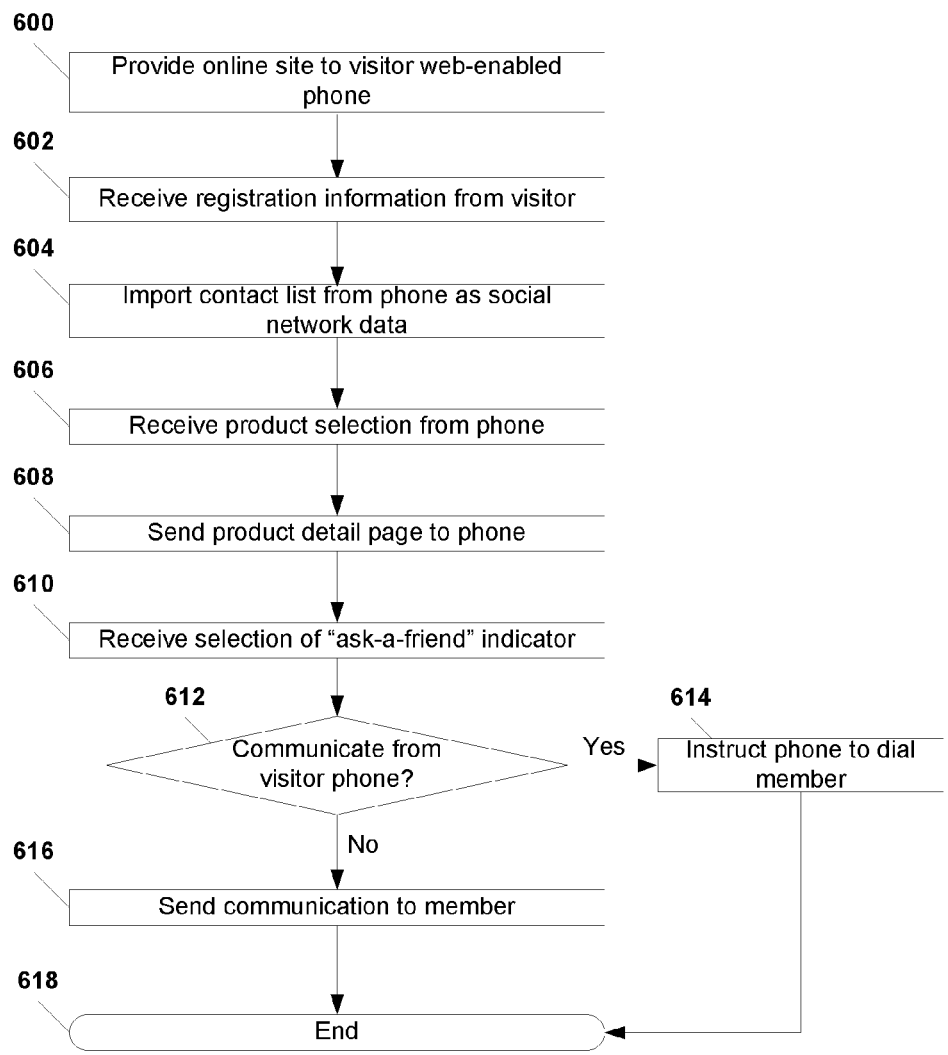
FIG. 6 is a flow diagram of a fourth particular embodiment of a method of providing recommendations.

Referring to FIG. 6, a fourth particular embodiment of a method of providing recommendations is illustrated. At block 600, a server system provides an online site to a visitor via a web-enabled phone. The online site provides a catalog of goods, services, subscriptions, other offerings, or any combination thereof, for purchase. Moving to block 602, the server system receives registration from the visitor via the online site. Proceeding to block 604, the server system imports a contact list or phone book from the web-enabled phone and stores the data as social network data associated with the visitor.

Continuing to block 606, the server system receives a selection of an offering, such as a product, from the visitor via the online site. Advancing to block 608, the server system sends a product detail page to the web-enabled phone. Continuing to block 610, the server system receives input indicating a selection of an "ask-a-friend" indicator or a similar selectable indicator provided with the product detail page.

Advancing to decision 612, the server system determines whether it is to communicate with a member of the social network of the visitor via the web-enabled visitor phone. If so, the method moves to block 614, and the server system can send an instruction to the web-enabled phone to dial the member, such that the visitor can speak with the member directly about the product. Whereas, if the server system is not to communicate via the visitor phone, the server system sends a communication to one or more members of the social network associated with the visitor. In one embodiment, the communication includes a message indicating the product and asking the member(s) to contact the visitor phone via a call, an e-mail, a text message, or any combination thereof. The method terminates at 618.

Figure 7:
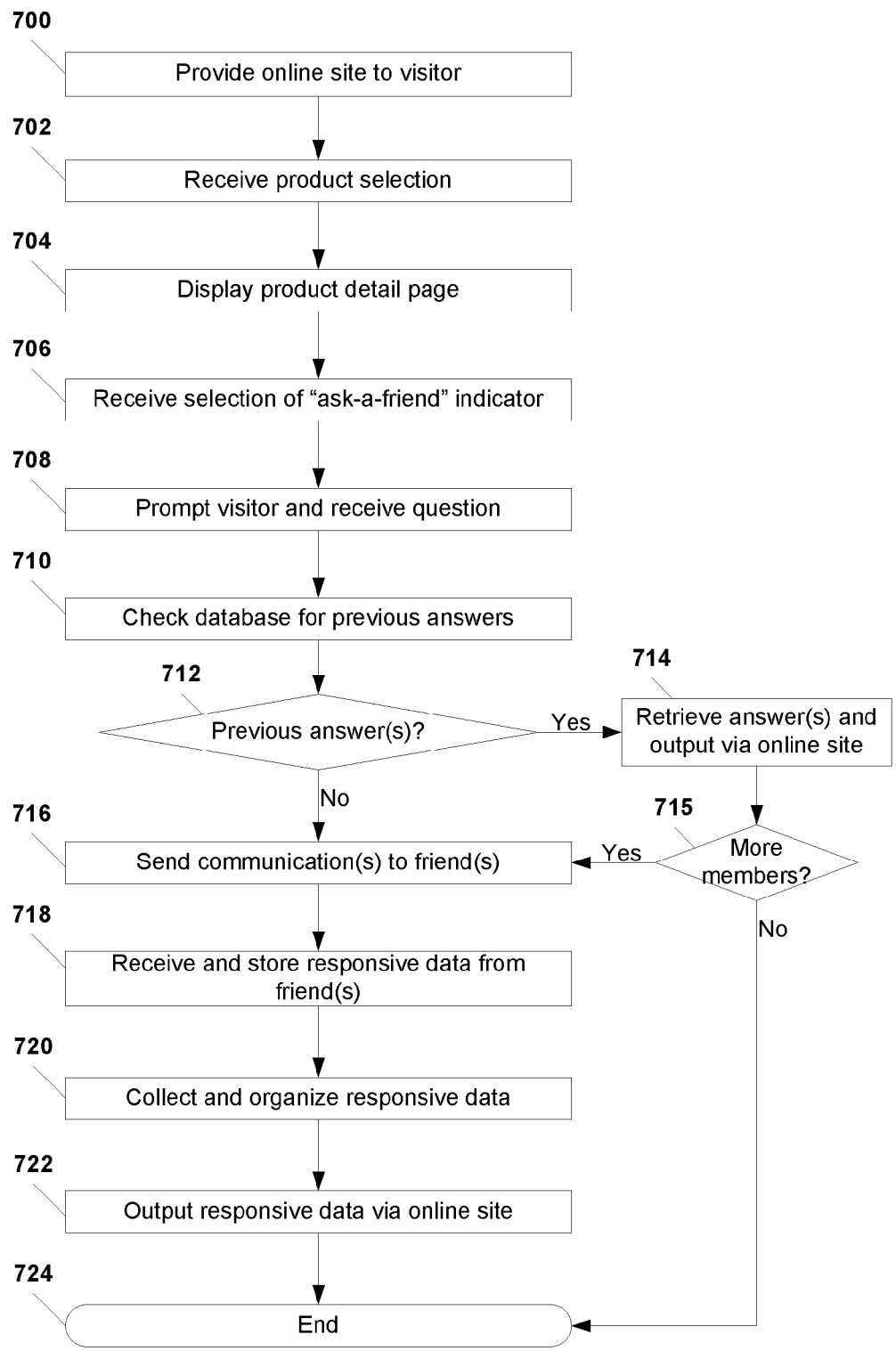
FIG. 7 is a flow diagram of a fifth particular embodiment of a method of providing recommendations.

Referring to FIG. 7, a fifth particular embodiment of a method of providing recommendations is illustrated. At block 700, a server system provides an online site to a visitor, such as a customer, via a computing device, mobile phone, or other device. The online site provides a catalog of goods, services, subscriptions, other offerings, or any combination thereof, for purchase. Moving to block 702, the server system receives a selection of an offering, such as a product, from the visitor via the online site. Proceeding to block 704, the server system displays a product detail page via the online site.

Continuing to block 706, the server system receives input indicating a request for data related to the offering from one or more members associated with a social network of the visitor. In one embodiment, the input includes a selection of an "ask-a-friend" indicator or a similar selectable indicator provided with the detail page. Advancing to block 708, the server system prompts the visitor and receives a question regarding the product.

At block 710, the server system checks a database for a previous answer given by each member for a same or similar question. Moving to decision node 712, the server system determines whether it has found one or more previous answers. If a previous answer has been found, the method proceeds to block 714, upon which the server system retrieves the previous answer and outputs the previous answer via the online site. Continuing to decision node 715, the server system determines whether there are one or more other members for whom previous answers were not found. If the server system determines that there are no such other members, the method terminates at 724.

Returning to decision node 712, if no previous answer is found for at least one member, the method proceeds to block 716, and the server system sends a communication to the member(s) for whom previous answers have not been found. Continuing to block 718, the server system receives responsive data from one or more members to whom a communication was sent. Advancing to block 720, the server system collects and organizes the responsive data. For example, the server system may organize responsive data according to which members have a favorable opinion and which members have an unfavorable opinion with respect to the product. At block 722, the server system outputs the organized data to the visitor via the detail page or another graphical interface of the online site. The method terminates at 724.

Figure 8:
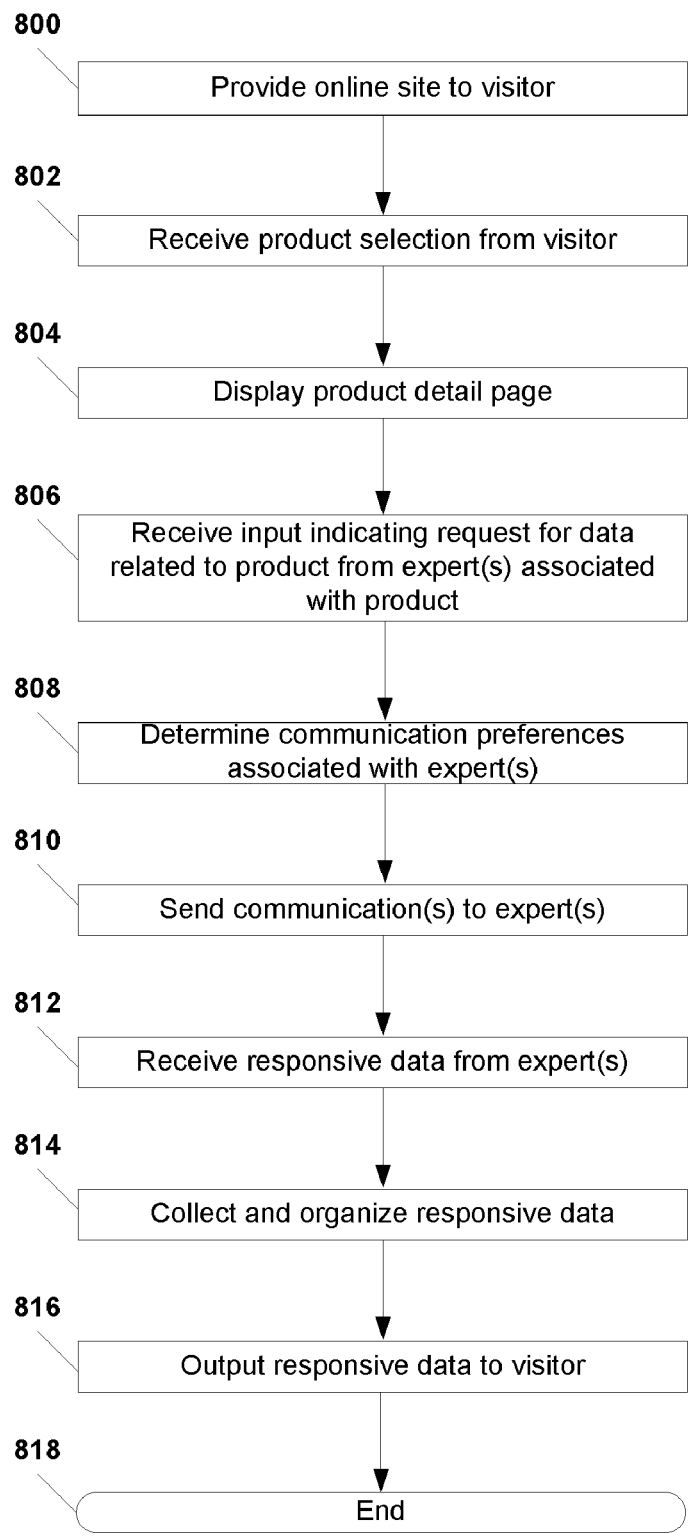
FIG. 8 is a flow diagram of a sixth particular embodiment of a method of providing recommendations.

Referring to FIG. 8, a fifth particular embodiment of a method of providing recommendations is illustrated. At block 800, a server system provides an online site to a visitor, such as a customer, via a computing device, mobile phone, or other device. The online site provides a catalog of goods, services, subscriptions, other offerings, or any combination thereof, for purchase. Moving to block 802, the server system receives a selection of an offering, such as a product, from the visitor via the online site. Proceeding to block 804, the server system displays a product detail page via the online site.

Continuing to block 806, the server system receives input indicating a request for data related to the offering from one or more experts associated with the product or with a category of the product. In one embodiment, the input includes a selection of an "ask-an-expert" indicator or a similar selectable indicator provided with the detail page. Advancing to block 808, the server system determines communications preferences associated with the expert(s). For instance, some experts may prefer to be contacted via e-mail, some via text message, others via instant messaging, others by phone call, and still others may have no communications preferences. Proceeding to block 810, the server system sends a communication to each expert, according to communications preferences associated with the expert.

Continuing to block 812, the server system receives responsive data from one or more experts to whom a communication was sent. Advancing to block 814, the server system collects and organizes the responsive data. For example, the server system may organize responsive data according to which experts have a favorable opinion and which experts have an unfavorable opinion with respect to the product. At block 816, the server system outputs the organized data to the visitor via the detail page or another graphical interface of the online site. The method terminates at 818.

Figure 9:
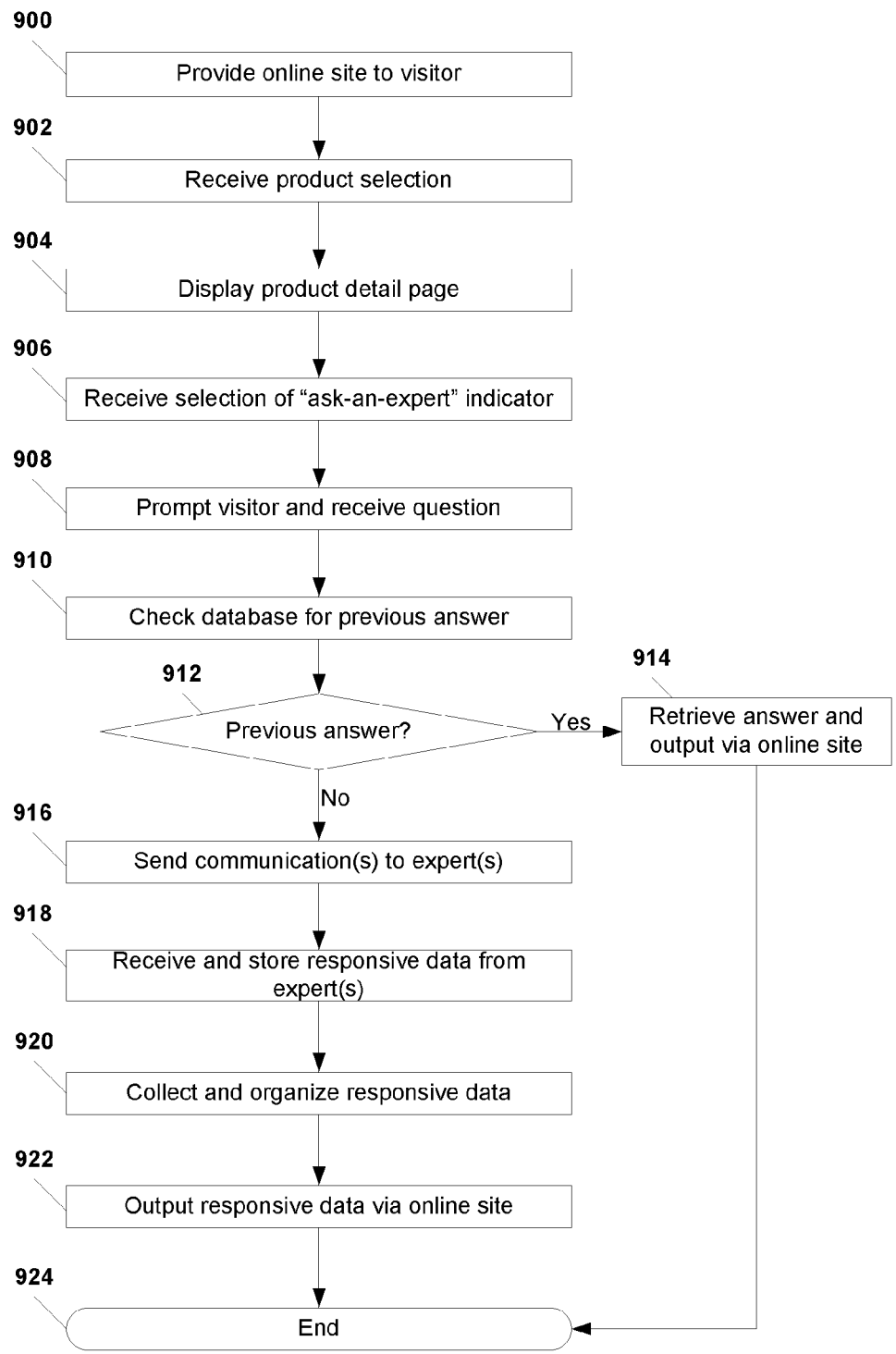
FIG. 9 is a flow diagram of a seventh particular embodiment of a method of providing recommendations.

Referring to FIG. 9, a sixth particular embodiment of a method of providing recommendations is illustrated. At block 900, a server system provides an online site to a visitor, such as a customer, via a computing device, mobile phone, or other device of the customer. The online site provides a catalog of goods, services, subscriptions, other offerings, or any combination thereof, for purchase. Moving to block 902, the server system receives a selection of an offering, such as a product, from the visitor via the online site. Proceeding to block 904, the server system displays a product detail page via the online site.

Continuing to block 906, the server system receives input indicating a request for data related to the offering from one or more experts associated with the product or with a category of the product. In one embodiment, the input includes a selection of an "ask-an-expert" indicator or a similar selectable indicator provided with the detail page. Advancing to block 908, the server system prompts the visitor and receives a question regarding the product.

At block 910, the server system checks a database for a previous answer given by the expert for a same or similar question. Moving to decision node 912, the server system determines whether it has found a previous answer. If a previous answer has been found, the method proceeds to block 914, upon which the server system retrieves the previous answer and outputs the previous answer via the online site. On the other hand, if no previous answer is found, the method proceeds to block 916, and the server system sends a communication to one or more experts.

Continuing to block 918, the server system receives responsive data from one or more experts to whom a communication was sent. Advancing to block 920, the server system collects and organizes the responsive data. For example, the server system may organize responsive data according to which experts have a favorable opinion and which experts have an unfavorable opinion with respect to the product. At block 922, the server system outputs the organized data to the visitor via the detail page or another graphical interface of the online site. The method terminates at 924.

In some embodiments, the methods disclosed herein may be performed as described. In other embodiments, certain aspects of the methods may be performed in alternate sequences or simultaneously. In addition, registration, social network setup, selection of an offering, or any combination thereof, may occur in a single session or in different sessions with the online site. Further, while the methods are largely described with reference to products, the methods may be applied to products, services, subscriptions, other online offerings, or any combination thereof.

Figure 10:
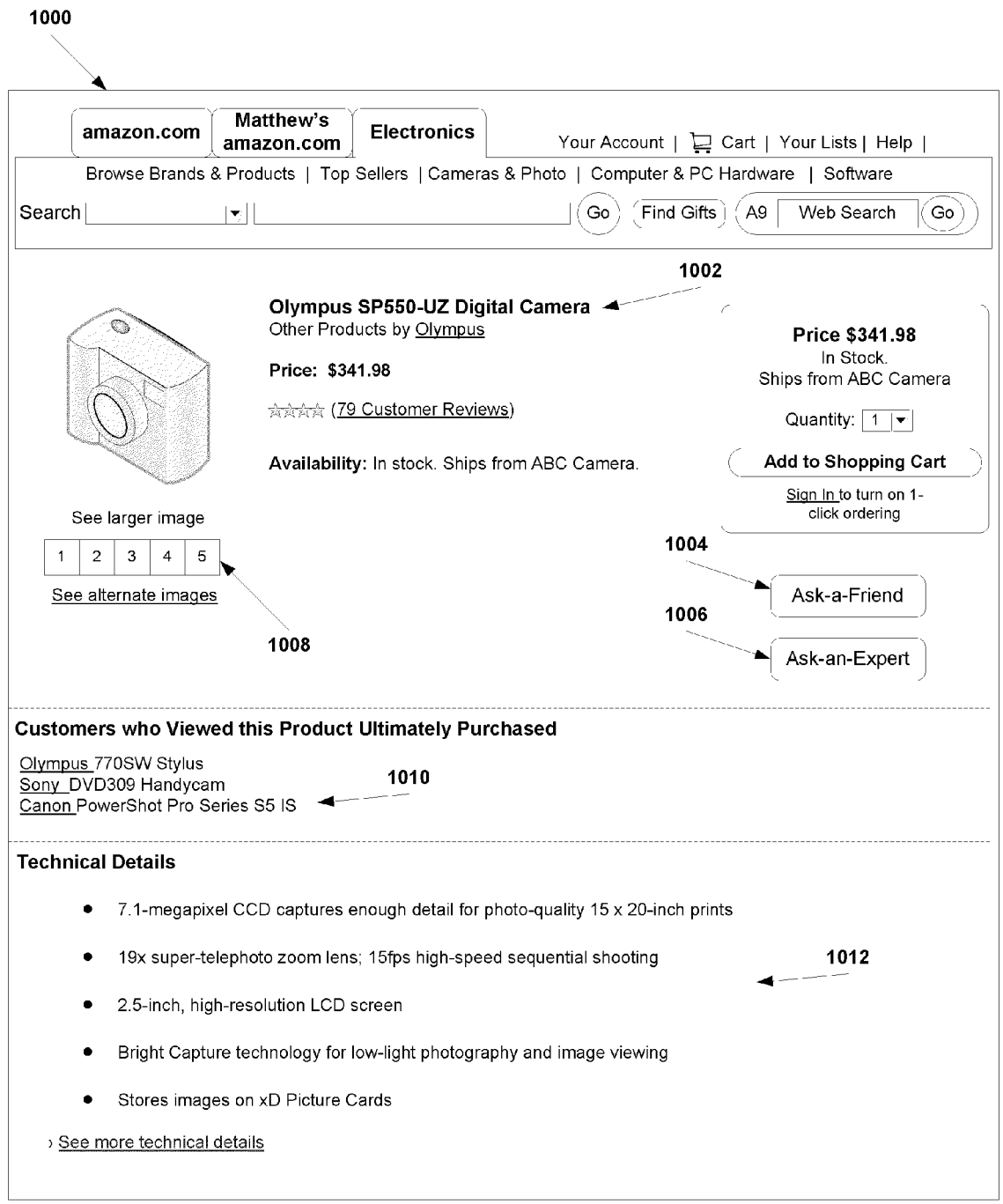
FIG. 10 is a diagram of a particular embodiment of a graphical user interface to provide recommendations.

Referring to FIG. 10, a particular embodiment of a graphical user interface (GUI) to provide recommendations is illustrated and designated generally 1000. The GUI 1000 includes a detail page related to a product 1002. The detail page includes an "ask-a-friend" indicator 1004, an "ask-an-expert" indicator 1006, or any combination thereof. In an illustrative embodiment, the GUI includes one or more images 1008 associated with the product 1002; unfiltered recommendations 1010, such as recommendations based on products purchased by other customers that viewed the product 1002; and technical details or specifications 1012 related to the product 1002.

The ask-a-friend indicator 1004 is selectable to send communications to one or more members of a social network associated with a visitor viewing the GUI 1000 and to receive responsive data from the member(s) via the GUI 1000. The ask-an-expert indicator 1006 is selectable to send communications to one or more experts associated with the product 1002 (or a category of the product 1002) and to receive responsive data from the expert(s) via the GUI 1000. In one embodiment, the expert(s) may include a representative of a vendor associated with the product 1002.

Referring to FIG. 11, a second particular embodiment of a graphical user interface (GUI) to provide recommendations is illustrated and designated generally 1100. The GUI 1100 includes a detail page related to a product 1002. The detail page includes an "ask-a-friend" indicator 1004, an "ask-an-expert" indicator 906, or any combination thereof. In an illustrative embodiment, the GUI 1100 includes one or more images 1008 associated with the product 1002.

In an illustrative embodiment, the ask-a-friend indicator 1004 is selectable to send communications to one or more members of a social network associated with a visitor viewing the GUI 1100 and to receive responsive data from the member(s) via the GUI 1100. In response to a selection of the ask-a-friend indicator 1004, the GUI 1100 may display a list of members associated with the social network. The list includes a plurality of selectable identifications 1110 of the members. A rating 1112 may be displayed in conjunction with one or more of the member identifications 1110. In a particular, non-limiting embodiment, selectable indicators 1114 of options to call a specific member of the social network can be displayed. For instance, the selectable indicator 1114 can be selectable to instruct a web-enabled phone of the visitor to dial a contact number of the member. The GUI 1100 includes a submit indicator 1116, or similar indicator, that is selectable to indicate that the visitor would like communications to be sent to the selected members. The GUI 1100 also includes a cancel indicator 1118, or similar indicator, that is selectable to indicate that the visitor no longer wishes to contact a member of the social network.

The ask-an-expert indicator 1006 is selectable to send communications to one or more experts associated with the product 1002 (or a category of the product 1002) and to receive responsive data from the expert(s) via the GUI 1100. In one embodiment, the expert(s) may include a representative of a vendor associated with the product 1002. In an illustrative embodiment, a list of selectable experts may be displayed via the GUI 1100.

Figure 12:
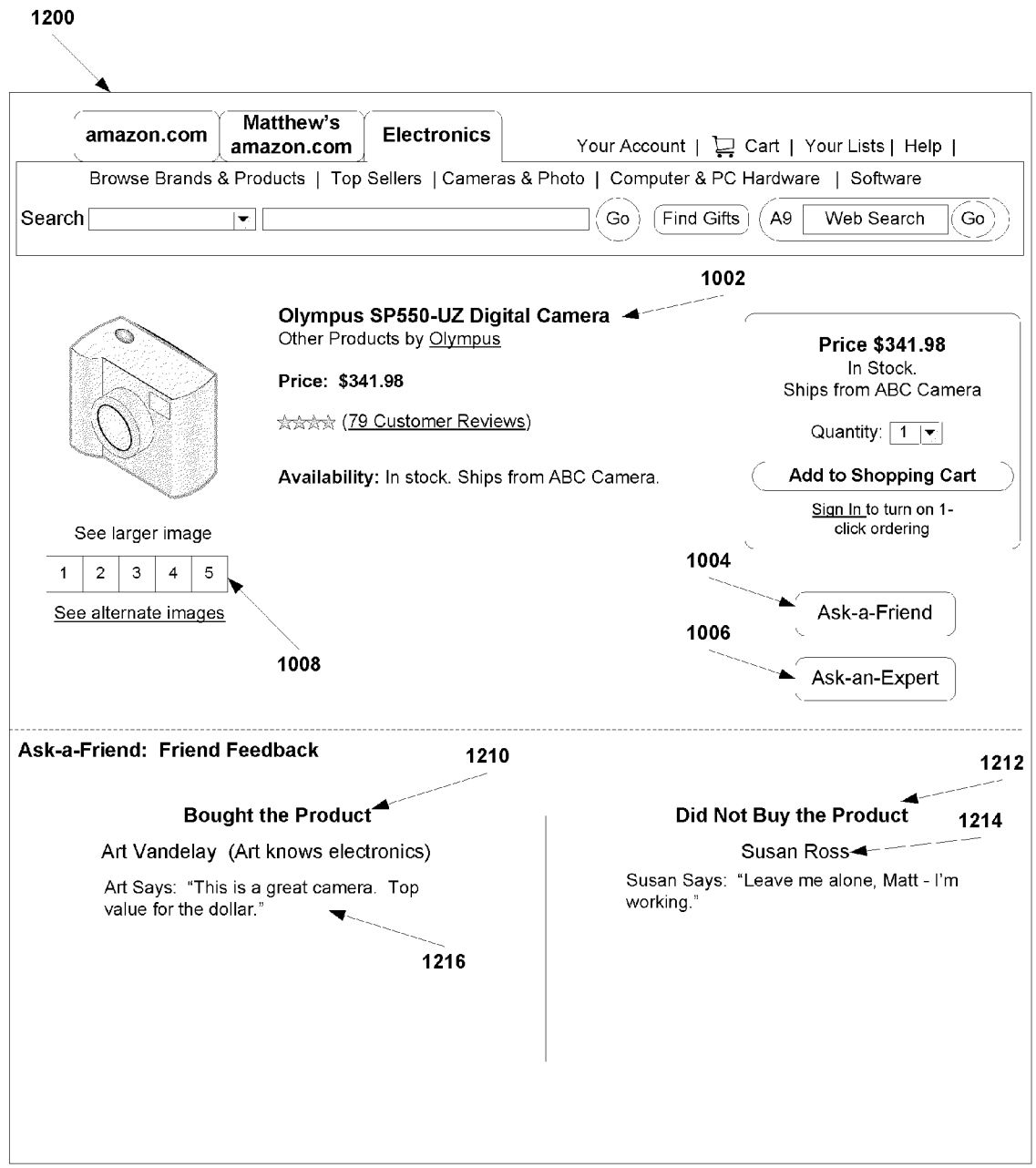
FIG. 12 is a diagram of a third particular embodiment of a graphical user interface to provide recommendations.

Referring to FIG. 12, a third particular embodiment of a graphical user interface (GUI) to provide recommendations is illustrated and designated generally 1200. The GUI 1200 includes a detail page related to a product 902. The detail page includes an "ask-a-friend" indicator 1004, an "ask-an-expert" indicator 1006, or any combination thereof. In an illustrative embodiment, the GUI includes one or more images 1008 associated with the product 1002.

In an illustrative embodiment, the ask-a-friend indicator 1004 is selectable to send communications to one or more members of a social network associated with a visitor viewing the GUI 1200 and to receive responsive data from the member(s) via the GUI 1200. The GUI 1200 may display responsive data from the members of the social network to whom communications were sent. The responsive data can be organized into categories, such as responsive data from members who bought the product 1210 and responsive data from members who did not buy the product 1212. Responsive data can include an identification of the member 1214 and a message indicating the responsive data received 1216.

The ask-an-expert indicator 1006 is selectable to send communications to one or more experts associated with the product 1002 (or a category of the product 1002) and to receive responsive data from the expert(s) via the GUI 1200. In one embodiment, the expert(s) may include a representative of a vendor associated with the product 1002.

Figure 13:
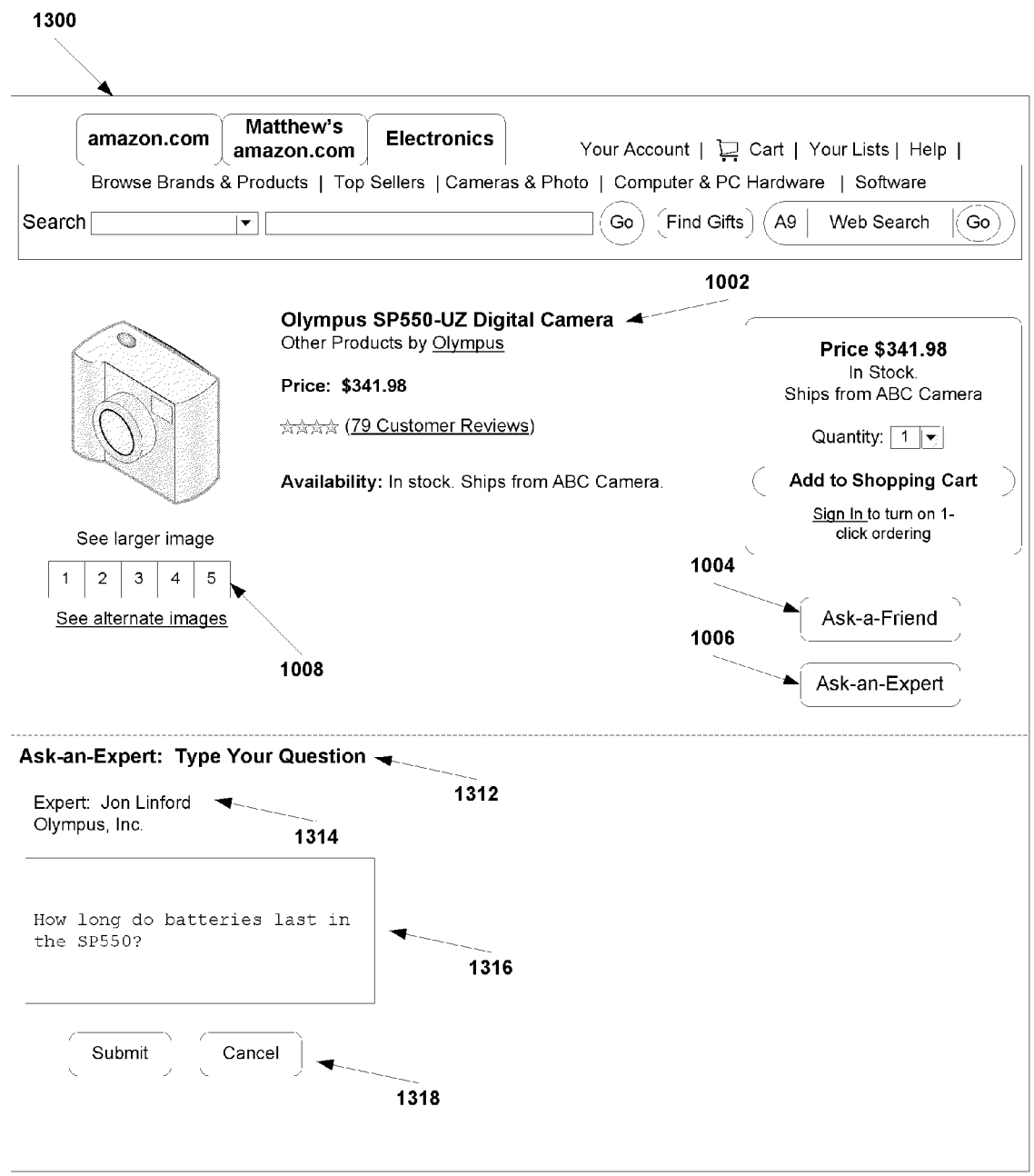
FIG. 13 is a diagram of a fourth particular embodiment of a graphical user interface to provide recommendations.

Referring to FIG. 13, a fourth particular embodiment of a graphical user interface (GUI) to provide recommendations is illustrated and designated generally 1300. The GUI 1300 includes a detail page related to a product 1002. The detail page includes an "ask-a-friend" indicator 1004, an "ask-an-expert" indicator 1006, or any combination thereof. In an illustrative embodiment, the GUI includes one or more images 1008 associated with the product 1002.

In an illustrative embodiment, the ask-a-friend indicator 1004 is selectable to send communications to one or more members of a social network associated with a visitor viewing the GUI 1300 and to receive responsive data from the member(s) via the GUI 1300. The ask-an-expert indicator 1006 is selectable to send communications to one or more experts associated with the product 1002 (or a category of the product 1002) and to receive responsive data from the expert(s) via the GUI 1300. In one embodiment, the expert(s) may include a representative of a vendor associated with the product 1002.

In response to a selection of the ask-an-expert button 1006, the GUI 1300 can provide a question region 1312. The question region 1312 identifies an expert 1314 associated with the product 1002. The question region 1312 also includes a text box 1316 in which the visitor can input a question to be answered by the expert. The question region 1312 also includes one or more indicators 1318 that are selectable to submit the question, cancel the ask-an-expert function, execute other functions, or any combination thereof.

Figure 14:
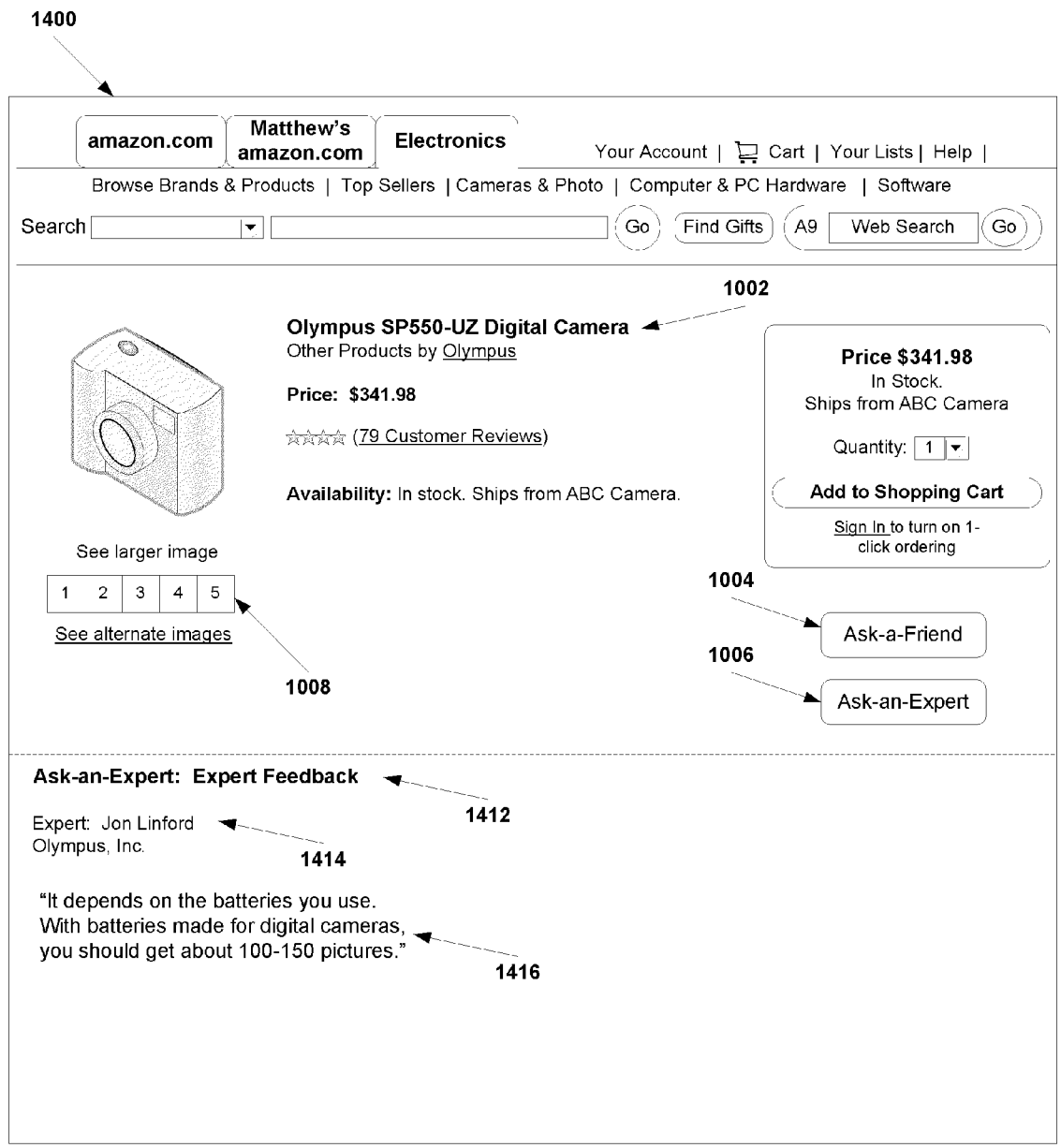
FIG. 14 is a diagram of a fifth particular embodiment of a graphical user interface to provide recommendations.

Referring to FIG. 14, a fifth particular embodiment of a graphical user interface (GUI) to provide recommendations is illustrated and designated generally 1400. The GUI 1400 includes a detail page related to a product 1002. The detail page includes an "ask-a-friend" indicator 1004, an "ask-an-expert" indicator 1006, or any combination thereof. In an illustrative embodiment, the GUI includes one or more images 1008 associated with the product 1002.

In an illustrative embodiment, the ask-a-friend indicator 1004 is selectable to send communications to one or more members of a social network associated with a visitor viewing the GUI 1400 and to receive responsive data from the member(s) via the GUI 1400. The ask-an-expert indicator 1006 is selectable to send communications to one or more experts associated with the product 1002 (or a category of the product 1002) and to receive responsive data from the expert(s) via the GUI 1400. In one embodiment, the expert(s) may include a representative of a vendor associated with the product 1002.

In response to a selection of the ask-an-expert button 1006, the GUI 1400 can provide an answer region 1412. The answer region 1412 identifies an expert 1414 associated with the product 1002. The answer region 1412 also includes an answer 1416 to a question sent to the expert by the visitor via the GUI 1400, as illustrated in FIG. 13.

FIG. 15 is a diagram of a sixth particular embodiment of a graphical user interface (GUI) to provide recommendations. The GUI is an example of a communication 1500 that is sent to a member of a social network associated with a visitor to an online site, in response to the visitor selecting an ask-a-friend indicator, such as the indicator 1004 illustrated in FIGS. 10-14. The communication 1500 includes a plurality of selectable responses 1502 regarding a product, service, subscription, or other offering at the online site. At least one of the selectable responses 1502 can include a field 1504 to input additional information when the selectable response 1502 is selected. The communication 1500 also includes a text box 1506 to input an opinion or other message to be output to the visitor of the online site.

In conjunction with the configuration of structure described herein, a system and method of providing recommendations are provided, which allow a visitor to an online site to receive opinions of social network members or experts, with respect to an offering that is available for purchase via the online site. In one embodiment, such opinions can be obtained in response to each selection of an ask-a-friend or ask-an-expert indicator. These real-time or near-real-time opinions can provide greater utility to the visitor than stock responses, reviews or recommendations, as opinions about a product, for instance, may change over time. Additionally, the visitor can obtain opinions from friends and experts that the visitor believes to have actual knowledge about a category of products or other offerings.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A computer-implemented method for providing recommendations, the computer-implemented method comprising:

as implemented by one or more computing devices configured with specific executable instructions, causing display of a user interface comprising information identifying an offering;

receiving input from a visitor indicating a request to receive data related to the offering from an expert associated with the offering, said input comprising a question related to the offering; and determining whether a data store includes a prior answer to the question by the expert;

when the determination is that the data store includes a prior answer to the question by the expert, providing the prior answer to the visitor without sending a communication to the expert; and when the determination is that the data store does not include a prior answer to the question by the expert, sending a communication to the expert in response to the request, wherein the communication requests data related to the question.

2. The computer-implemented method of claim 1, further comprising:

receiving responsive data from the expert; and causing display of the responsive data received from the expert.

3. The computer-implemented method of claim 1, further comprising receiving feedback regarding the expert from the visitor.

4. The computer-implemented method of claim 1, wherein the expert has been previously designated by a vendor associated with the offering.

5. The computer-implemented method of claim 1, wherein the user interface comprises ratings associated with at least one expert, wherein the ratings indicate at least one of: trust levels, expertise levels and comment quality levels.

6. The computer-implemented method of claim 1, wherein the communication to the expert include at least one of: a text message, an instant messaging communication, an e-mail message, and a call from an interactive voice response system.

7. A system for providing recommendations, the system comprising:

a data store; and a computing device in communication with the data store and that is operative to:

cause display of a user interface comprising information associated with an offering available for purchase;

receive input from a visitor indicating a request to receive data related to the offering from an expert associated with the offering, said input comprising a question related to the offering;

determine whether a data store includes a prior answer to the question by the expert;

when the determination is that the data store includes a prior answer to the question by the expert, provide the prior answer to the visitor without sending a communication to the expert; and when the determination is that the data store does not include a prior answer to the question by the expert, send a communication to the expert in response to the request, wherein the communication requests data related to the question.

8. The system of claim 7, wherein the offering comprises at least one of a product, a service and a subscription.

9. The system of claim 7, wherein the computing device is further operative to receive responsive data from the expert.

10. The system of claim 9, wherein the computing device is further operative to cause display of the responsive data received from the expert.

11. The system of claim 7, wherein the computing device is further operative to send the communication to each of a plurality of experts according to a communication preference received from the expert prior to the request.

12. The system of claim 7, wherein the computing device is further operative to receive feedback regarding the expert from the visitor.

13. The system of claim 7, wherein the computing device is further operative to select an expert associated with an offering based at least in part on feedback received from visitors regarding the expert.

14. The system of claim 7, wherein the expert is associated with an offering category that is associated with the offering.

15. The system of claim 14, further comprising associating the expert with an offering category based at least in part on a number of responses by the expert to visitor requests related to offerings associated with the offering category.

16. The system of claim 14, further comprising associating the expert with an offering category based at least in part on visitor feedback regarding responses by the expert to visitor requests related to offerings associated with the offering category.

17. A non-transitory computer-readable medium having a computer-executable component for providing product recommendations, the computer-executable component comprising:

a user interface component for:

causing display of a user interface comprising information associated with a product; and receiving input from a visitor indicating a request to receive data related to the product from an expert associated with the product, said input comprising a question related to the product determining whether a data store includes a prior answer to the question by the expert;

when the determination is that the data store includes a prior answer to the question by the expert, providing the prior answer to the visitor without sending a communication to the expert; and when the determination is that the data store does not include a prior answer to the question by the expert, sending a communication to the expert in response to the request, wherein the communication requests data related to the question.

18. The computer-readable medium of claim 17, wherein the user interface component is further configured to cause display of responsive data received from the expert.

19. The computer-readable medium of claim 17, wherein the user interface component is further configured to receive feedback regarding the expert from the visitor.

\* \* \* \* \*